United States Patent [19]

Smith

[11] Patent Number: 4,939,987
[45] Date of Patent: Jul. 10, 1990

[54] HUMIDITY CONTROL SYSTEM

[75] Inventor: Mark J. Smith, Fuquay-Varina, N.C.

[73] Assignee: Anetsberger Brothers, Inc., Northbrook, Ill.

[21] Appl. No.: 393,967

[22] Filed: Aug. 14, 1989

[51] Int. Cl.⁵ .................... F24H 9/00; H05B 1/00; H05B 3/10; A21C 13/00

[52] U.S. Cl. .................... 99/468; 99/474; 99/483; 126/20; 126/348; 126/369; 219/272; 219/273; 219/362; 219/401

[58] Field of Search ............ 99/468, 473, 474, 475, 99/476, 483; 126/20, 348, 369; 219/401, 400, 402, 409, 413, 273, 275, 272, 328, 362; 261/130, 131, 27, 74

[56] References Cited

U.S. PATENT DOCUMENTS

| | | | |
|---|---|---|---|
| 2,499,525 | 3/1950 | Person | 219/401 X |
| 3,215,416 | 11/1965 | Liben | 261/130 X |
| 3,456,598 | 7/1969 | MacKay | 99/483 |
| 3,518,949 | 7/1970 | Stock | 99/328 X |
| 3,744,474 | 7/1973 | Shaw | 219/401 X |
| 3,895,215 | 7/1975 | Gordon | 219/400 |
| 4,173,215 | 11/1979 | Bureau et al. | 99/468 X |
| 4,346,048 | 8/1982 | Gates | 219/362 X |
| 4,373,430 | 2/1983 | Allen | 99/474 X |
| 4,426,923 | 1/1984 | Ohata | 99/474 X |
| 4,483,243 | 11/1984 | Cote | 99/468 |
| 4,674,402 | 6/1987 | Raufeisen | 99/468 |
| 4,722,268 | 2/1988 | Rightley | 219/401 X |
| 4,724,824 | 2/1988 | McCoy et al. | 126/348 |
| 4,835,368 | 5/1989 | Fortmann et al. | 126/20 X |
| 4,891,498 | 1/1990 | Fortmann et al. | 126/20 X |

Primary Examiner—Harvey C. Hornsby
Assistant Examiner—Scott J. Haugland
Attorney, Agent, or Firm—McCaleb, Lucas & Brugman

[57] ABSTRACT

An electrical control system for regulating the humidity of an enclosed atmosphere in a dough proof box or the like, comprising a cast metal steamer tray, incorporating an electrical heating element operable to heat the tray between selected upper and lower temperature limits determined by a thermostat responsive to temperatures of the tray casting. A time controlled valve supplies water to the tray for selected time intervals when the thermostat senses the tray's upper temperature. A humidistat controls operation of the thermostat. As a result, the steamer tray is heated between high and low limits and supplied with measured amounts of water to effect rapid generation of limited quantities of steam to satisfy the humidity levels demanded by the humidistat.

7 Claims, 2 Drawing Sheets

HUMIDITY CONTROL SYSTEM

This invention pertains to humidifiers and more particularly to improved means for automatically controlling and regulating the humidity of an enclosed atmosphere.

BACKGROUND OF THE INVENTION

In the art of baking breads and like bakery goods, it is time honored practice to hold the dough having a rising agent, for a period of time to enable the dough to properly rise prior to baking. In commercial bakeries this evolution is usually carried out in a so called "proofing-box" or cabinet having an enclosed atmosphere in which the temperature and humidity are regulated to insure uniform consistency and quality in the baked end products.

Generally, past practice has employed steam, generated in a heated open tray or pan and circulating air to humidify the proofing box atmosphere. Problems arise with this approach, however, due to the inability to accurately control the steaming cycle, particularly as to the time required to start and stop steam generation and its release into the atmosphere. Consequently, automatic humidity control and regulation under the prior art has been relatively inaccurate.

One typical attempt at resolving this difficulty is demonstrated in U.S. Pat. No. 3,456,598, issued July 22, 1969, wherein a cover is placed over an open steaming tray having an immersed heater; the cover being manually adjustable to regulate release of steam into the atmosphere.

In a related field of development, U.S. Pat. No. 3,895,215, issued July 15, 1975, utilizes heated moving air streams into which water vapor is released for humidifying the atmosphere of a food holding and warming cabinet.

SUMMARY OF THE INVENTION

This invention is directed to an improved system for automatically controlling the humidity of an enclosed atmosphere in contravention of the difficulties and shortcomings of the prior art.

In brief, the invention includes a control system comprising a heater in intimate heat transfer relation with an open top cast metal steamer tray, a time regulated water control valve having a selectively operable time delay for regulating the open time of the valve, a thermal responsive means reactive to the temperature of the tray casting and in control relation with the tray heater and water control valve, and a humidity responsive means controlling operation of the thermal responsive means. The control arrangement is such that when the humidity responsive means demands humidity, the thermal responsive means is actuated to energize the steamer heater. When the tray casting reaches a predetermined high temperature, the the heater is deactivated and the water control valve supplies water to the heated tray for a set time interval. The water evaporates rapidly and cools the heated tray casting until it reaches a preset low temperature whereupon the heater is again activated to evaporate any water remaining in the tray and reheat the casting until it reaches its upper temperature limit; this cycle is repeated until the humidistat is satisfied and the steamer heater thermostat is deenergized. In a preferred embodiment the control system is electrically powered.

It is an important object of this invention to provide an improved system for controlling the humidity of an enclosed atmosphere.

It is another important object of this invention to provide an improved steam generating means and means for controlling its operation to produce relatively constant humidity levels in an enclosed atmosphere.

It is a further object of this invention to provide a humidifier for enclosed atmospheres which utilizes a steam generating means that is rapidly responsive to humidity requirements.

It is still another important object of this invention to provide an improved steam generating means for a humidifier system which utilizes an electrical heater embedded in a cast metal steamer tray and thermostatic switch means which respond to the temperature of the tray casting for controlling the heater.

Another important object of this invention is to provide a system for automatically regulating the humidity levels of an enclosed atmosphere which comprises a thermostatically controlled heater and water supply means arranged so that water is periodically supplied to a heated cast metal steamer tray in small time measured quantities at predetermined temperatures of the tray casting to generate and release limited quantities of steam into the atmosphere.

Having described this invention the above and further objects, features and advantages thereof will be recognized by those familiar with the art from the following detailed description of a preferred embodiment thereof, illustrated in the accompanying drawings, and representing the best mode presently contemplated for enabling those with skill in the art to practice this invention.

IN THE DRAWINGS

DESCRIPTION OF THE PREFERRED EMBODIMENT

With reference to the drawings, the features of a preferred embodiment of this invention, will be described.

Figure 1:
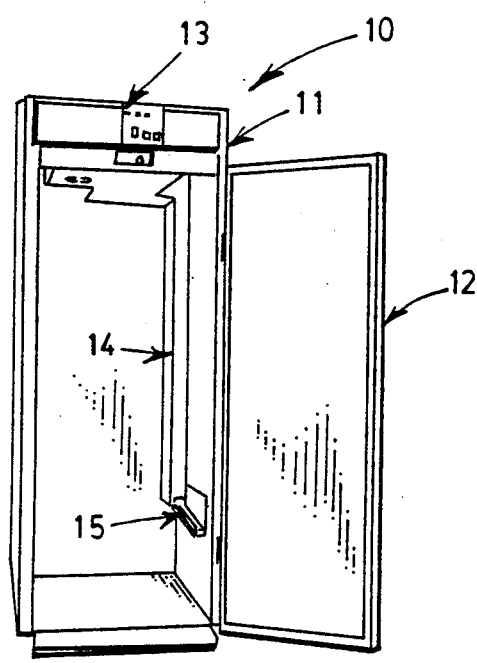
FIG. 1 is a perspective view of a dough proof box embodying the feature of this invention.

As shown in FIG. 1, a typical dough proofing box, is indicated generally at 10. Box 10 comprises an insulated upright cabinet 11 equipped with a hingedly mounted front door 12 providing access to the cabinet's interior in which dough is to be held in an environment of controlled temperature and humidity. Suitable temperature and humidity operating controls 13 are located at the upper end of the cabinet along with air circulating ducts, blowers and heaters for supplying heated air to a distribution duct 14 located along one side of the cabinet's interior. An improved steamer tray assembly 15, of this invention is mounted adjacent the outlet end of the air supply duct 14. Water and electricity are supplied to the tray 15 and controls 13, respectively, as will appear presently.

Figure 2:
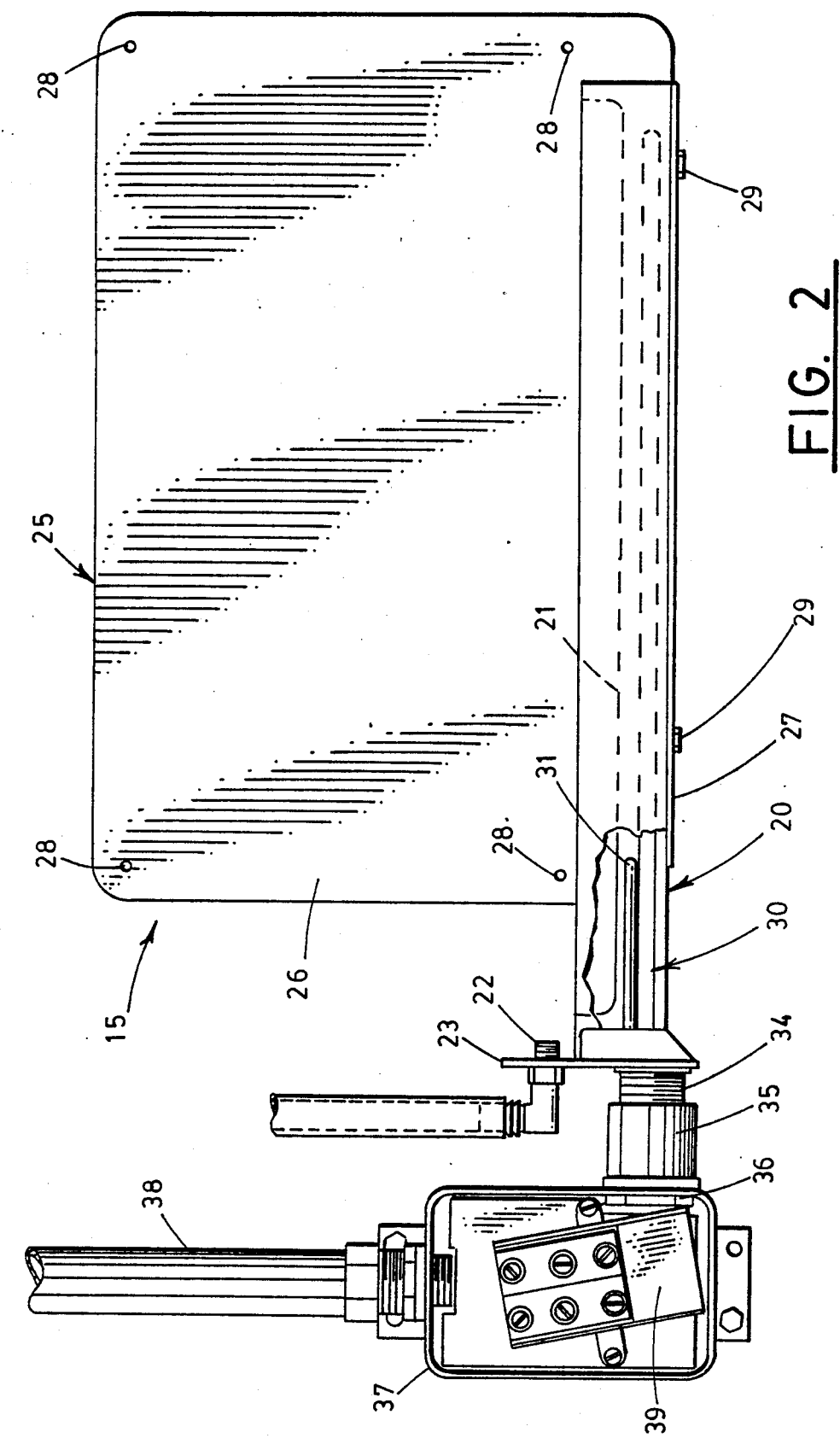
FIG. 2 is a side elevation, with parts broken away of an improved steamer tray of this invention.

With special reference to FIG. 2, the tray assembly 15 comprises an open top tray 20, preferably cast of aluminum or other material capable of good heat conduction. The tray is elongated, of generally rectangular configuration and has an open top tank chamber 21 extending inwardly of its upper side for reception of water from a supply fitting 22 attached to bracket 23 fixed to one end of the tray.

A tray support bracket 25, comprising a large planar body 26 formed with a right angularly related support flange 27 along its lower edge is adapted to be attached to an interior wall of the cabinet 11 as by sheet metal screws (not shown) receptive in mounting openings 28 in body 26. Bolts 29 extend through shelf or flange 27 into the underside of the tray body to fix the tray to bracket 25.

Internally the tray casting contains one or more electrical calrod type heating elements 30, preferably cast with the body of the tray. A thermal probe 31 also extends into the tray casting to sense the latter's temperature. Probe 31 fits into a bore socket adjacent heater element 30 and may be removed for repair or replacement as needed. Electrical leads for heater element 30 and probe 31, extend through a cylindrical boss 34 formed at one end of the tray and provided with external threads. Internally threaded sleeve 35 thread over the boss 34 and a connector fitting 36 fixed to a junction box 37 (shown uncovered). Conduit 38 carries electrical conductors (not shown) to a terminal plate 39 to which the electrical leads from the tray heater element and thermal probe are also joined.

Figure 3:
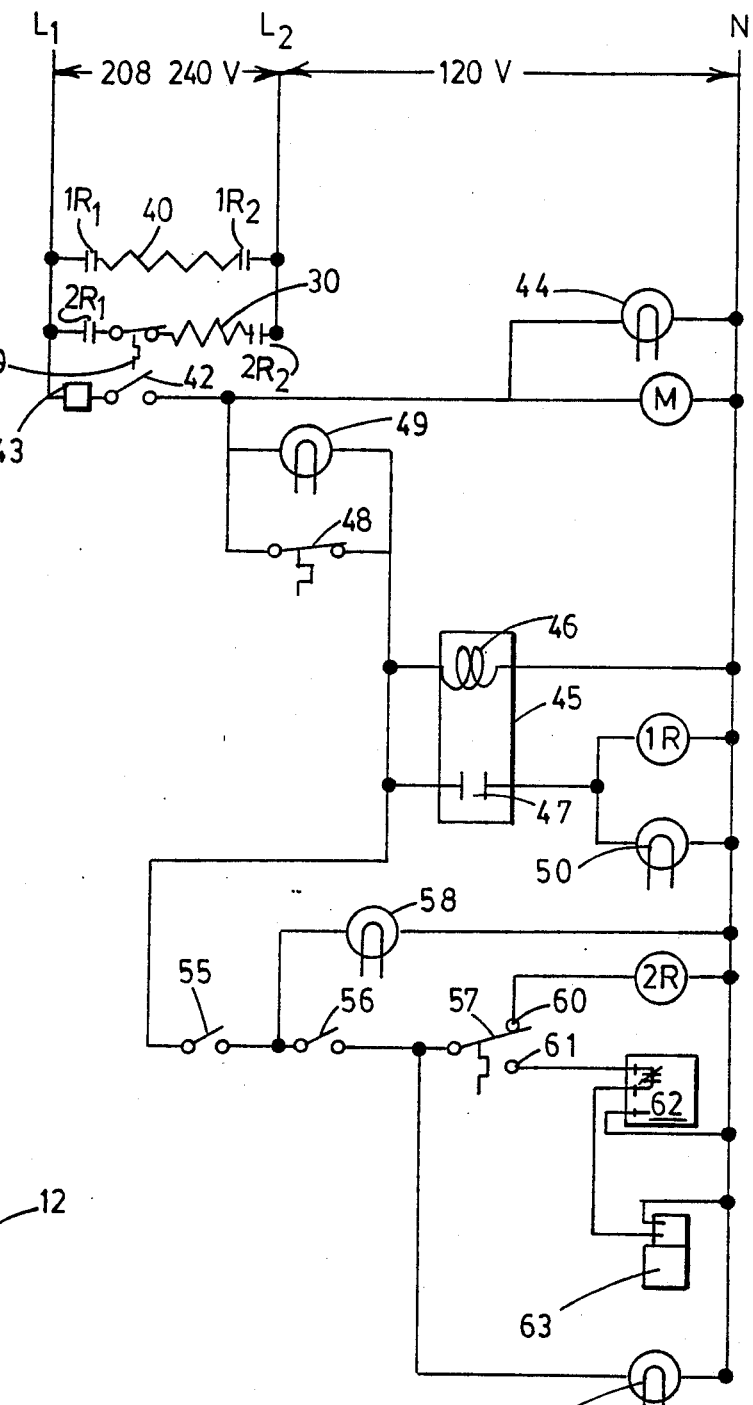
FIG. 3 is a schematic diagram of an electrical control circuit according to this invention.

With reference to FIG. 3, the features of an electrical control system according to this invention for controlling the internal environment of the dough proofing box 10 of FIG. 1 will now be described.

As there indicated line conductors $L_1$ and $L_2$ and neutral conductor N are supplied from a normal 208/240V or greater, 60 Hz supply source.

An air heating element 40, in series circuit with relay contacts $1R_1$ and $1R_2$ is connected between conductors $L_1$ and $L_2$. Element 40 works in conjunction with blower motor 41 in series with manual control switch 42 and protective fuse 43 connected across $L_1$ and N to energize heater 40 and circulate air within the proofing box cabinet 11. A ready light 44 in parallel circuit with motor 41 indicates the "on" or energized state of the motor circuit.

An air heater thermostat 45 having a heater coil 46 and thermal responsive switch contacts 47 controls relay $1R_1$; closure of switch 47 serving to energize relay contacts 1R and $1R_2$ to energize heater 40. Thermostat 45 is energized with the motor circuit via a normally closed thermally responsive switch 48 set to open at a predetermined high temperature limit for the air heater element 40. Opening of switch 48 serves to energize an alarm light 49 to indicate the overheated condition of the heater element as would occur if relay 1R failed to open contacts $1R_1$ and $1R_2$ in response to the supervising operation of thermostat 45. A ready light 50 in parallel circuit with relay 1R indicates that heater 40 is "on".

Humidity is regulated by a steamer control circuit in series relation with the motor and heater control circuit above described; such being conditioned for operation upon closure of the manual heat control switch 42.

More specifically, as indicated in FIG. 3, a manually operated switch 55 in series with a humidistat 56 exercises overall control of steamer thermostat 57. A ready light 58 is in circuit with switch 55 to indicate the "on" condition of switch 55. This advises the operator that humidity is demanded. The steamer thermostat 57 is activated in response to closure of the humidistat 56 which is capable of being selectively adjusted to "open" at desired humidity levels. Thus when the atmospheric humidity is lower than the desired level, switch 56 is closed and remains so until its set humidity level is attained. With switch 56 closed the steamer thermostat is activated to respond to the temperature of the steamer tray 20 as sensed by the temperature probe 31 described heretofore. The thermostat is set to "close" at sensed temperatures below a selected low temperature, such as 220° F., and to "open" at a preset high temperature of 230° F., by way of illustration.

The closed condition of the thermally responsive switch 57, as indicated in FIG. 3, energizes relay 2R which closes contacts $2R_1$ and $2R_2$ in circuit with the steamer heating element 30 to energize the same. It will be noted that element 30 is guarded by a manually resettably, thermally responsive switch 59 set to open at a preset high temperature of the steamer tray. Opening operation of switch 59 deenergizes the steamer heating element in the event of failure of relay 2R, thereby guarding element 30 from overheating.

When the steamer tray temperature reaches a preset high limit (in the order of 230° F. in the illustrated case), relay 2R is deenergized by operation of the thermostatic switch 57. Opening operation of the thermostat serves to energize a water control circuit by moving the thermostat's switch arm from primary contact 60 to a secondary contact 61. At the same time the heating element 30 is deenergized with opening operation of relay contacts $2R_1$ and $2R_2$.

Energization of the secondary thermostat contact 61 serves to energize a timer 62, such as a digital time delay circuit module commercially available from INFITEC, INC., Syracuse, N.Y. Timer 62 in turn serves to operate a water control valve 63 to "open" for a preset time interval (in the order of 3 seconds) to supply a limited quantity of water to the hot steamer tray 20. Typically an electrically operated solenoid operated valve is ideal for the purpose. A ready light 64 turns on and off with energization and deenergization of relay 2R to indicate the status of the humidity control circuit.

Water introduced into the hot steamer tray rapidly generates steam into the heated air supplied by duct 14. This humidifies the atmosphere and cools the steamer tray to below the 220° F. thermostat setting, causing the latter to reenergize the tray heating element 30 and deenergize timer 62 and water supply valve 63.

Any water remaining in tray 20 is steamed off and when the tray is dry its temperature rises until it again reaches the "high" temperature of 230° F. The tray heater is again deenergized, water is added to the tray and the cycle repeats until the required humidity demanded by humidistat 56 is satisfied.

While the circuit described and shown in FIG. 3, embodies only one tray heating element 30, more than one such element may be employed as required to rapidly heat the steamer tray.

In light of the foregoing it is believed those of skill in the art will readily recognize the improved advancement of this invention over the prior art. Further, while the invention has been described in relation to a preferred embodiment thereof, such is readily susceptible to modification, change and substitution of equivalents without departing from the scope of the invention as defined in the following appended claims.

The embodiments of the invention in which an exclusive property or privilege is claimed are defined as follows:

1. Apparatus for controlling the humidity of an enclosed atmosphere comprising: an open top steamer tray, a heater in intimate heat transfer relation with said tray, a time regulated valve operable to supply water to said tray for selected time periods, thermal responsive means operably responsive to the temperature of said tray for activating and deactivating said heater when said tray reaches selected low and high temperatures, respectively, and for actuating said valve to supply water to said tray when said heater is deactivated at said high temperature, and humidity responsive means for controlling activation of said thermal responsive means.

2. The apparatus of claim 1 wherein said tray comprises a unitary casting and said heater comprises an electrical element embedded in said casting.

3. The apparatus of claim 1, wherein said heater, thermal responsive means, valve and humidity responsive means are electrically operable and in circuit relation.

4. A system for regulating the humidity of an enclosed atmosphere, comprising: an open top steamer tray, an electrical heater element in intimate heat transfer relation with said tray, valve means for supplying water to said tray, and an electrically powered control circuit for regulating the generation of steam in said tray comprising a humidistat controlling operation of said circuit and operable to respond to selected humidity levels, a thermostat with a sensing means in intimate contact with said tray, operable to energize said heater element at a selected low tray temperature and to deenergize the same at a selected high tray temperature, and electrical timer means for controlling said valve means to supply water to said tray for selected time intervals, said timer means being operatively activated to open said valve means in response to deactivation of said heater element.

5. The system of claim 4, and manually operable switch means for controlling activation of said humidistat.

6. The system of claim 4, wherein said tray comprises a unitary metal casting and said heater is embedded in said casting.

7. The system of claim 4, wherein said tray comprises a unitary metal casting that embodies a high limit thermostat for controlling temperature of said tray.

* * * * *